US012428878B1

(12) United States Patent
Berglund et al.

(10) Patent No.: US 12,428,878 B1
(45) Date of Patent: Sep. 30, 2025

(54) SECURITY DEVICE

(71) Applicant: InVue Security Products Inc., Charlotte, NC (US)

(72) Inventors: David N. Berglund, Charlotte, NC (US); Gary A. Taylor, Fort Mill, SC (US); Wesley J. Blanchard, Fort Mill, SC (US); Christopher Helman, Cornelius, NC (US); Daniel C. Symons, Waxhaw, NC (US); John DeFilippi, Charlotte, NC (US); Jason Amistadi, Charlotte, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 19/084,136

(22) Filed: Mar. 19, 2025

Related U.S. Application Data

(60) Provisional application No. 63/764,087, filed on Feb. 27, 2025, provisional application No. 63/654,456, filed on May 31, 2024.

(51) Int. Cl.
*E05B 73/00* (2006.01)

(52) U.S. Cl.
CPC ...... *E05B 73/0017* (2013.01); *E05B 73/0082* (2013.01)

(58) Field of Classification Search
CPC . E06B 73/0017; E06B 73/0082; A47F 7/0246
See application file for complete search history.

(56) References Cited

U.S. PATENT DOCUMENTS

| | | | |
|---|---|---|---|
| 5,757,616 | A | 5/1998 | May et al. |
| 5,878,211 | A | 3/1999 | Delagrange et al. |
| 5,947,359 | A | 9/1999 | Yoshie |
| 5,966,285 | A | 10/1999 | Sellers |
| 6,380,855 | B1 | 4/2002 | Ott |
| 6,581,420 | B1 | 6/2003 | Ling et al. |
| 6,595,792 | B1 | 7/2003 | Rudolph et al. |
| 6,763,690 | B2 | 7/2004 | Galant |

(Continued)

FOREIGN PATENT DOCUMENTS

| | | | |
|---|---|---|---|
| CN | 102037201 | A | 4/2011 |
| WO | 2012/137007 | A1 | 1/2012 |

(Continued)

OTHER PUBLICATIONS

Vanguard Protex Global, Inc., "Volt the Power to Inspire Awe", Jun. 8, 2012, pp. 1-2.

(Continued)

*Primary Examiner* — Eret C McNichols
(74) *Attorney, Agent, or Firm* — InVue Security Products Inc.

(57) ABSTRACT

A security device for securing an item of merchandise from theft is provided. The security device includes a housing configured to be coupled to the item of merchandise and a lock mechanism operably engaged with the housing. The lock mechanism is operable to lock the item of merchandise within or to the housing in a locked configuration and to allow the item of merchandise to be removed from the housing in an unlocked configuration. The lock mechanism is configured to communicate with an electronic key for locking and/or unlocking thereof.

27 Claims, 18 Drawing Sheets

(56) References Cited

U.S. PATENT DOCUMENTS 6,913,232 B2 7/2005 Richter
7,035,095 B2 4/2006 Frame et al.
7,218,226 B2 5/2007 Wehrenberg
7,299,668 B1 11/2007 Lu
7,327,276 B1 2/2008 Deconinck et al.
7,522,047 B2 4/2009 Belden, Jr. et al.
7,592,548 B2 9/2009 Marszalek et al.
7,598,842 B2 10/2009 Landram et al.
7,614,601 B2 11/2009 Marsilio et al.
7,661,648 B2 2/2010 Lin
7,701,339 B2 4/2010 Irmscher et al.
7,753,330 B2 7/2010 Brief
7,971,845 B2 7/2011 Galant
7,993,414 B2 8/2011 Jeansonne et al.
8,066,241 B2 11/2011 Yu et al.
8,106,772 B2 1/2012 Irmscher et al.
8,191,851 B2 6/2012 Crown
8,212,672 B2 7/2012 Brenner
8,250,278 B2 8/2012 Tseng et al.
8,418,514 B1 4/2013 Su
8,451,115 B2 5/2013 Imukai et al.
8,451,128 B2 5/2013 Yang
8,452,868 B2 5/2013 Shafer et al.
8,508,363 B2 8/2013 Raniere
8,558,688 B2 10/2013 Henson et al.
8,564,438 B2 10/2013 Fawcett et al.
8,581,713 B1 11/2013 Morgan et al.
8,711,553 B2 4/2014 Trinh et al.
8,749,387 B2 6/2014 Fawcett et al.
8,813,528 B2 8/2014 Olear et al.
8,814,128 B2 8/2014 Trinh et al.
8,833,116 B1 9/2014 Brown
8,869,573 B2 10/2014 Myers et al.
8,872,660 B2 10/2014 Yunker et al.
8,910,914 B2 12/2014 Bigeh
8,979,040 B2 3/2015 Chien et al.
9,032,766 B2 5/2015 Su
9,097,380 B2 8/2015 Wheeler
9,159,309 B2 10/2015 Liu et al.
9,161,466 B2 10/2015 Huang
9,163,433 B2 10/2015 Sedon
9,194,532 B2* 11/2015 Bisesti .................... A47F 7/024
9,252,605 B1 2/2016 Custon et al.
9,474,392 B2* 10/2016 Howarth .............. F16M 11/041
9,567,776 B2 2/2017 Moock et al.
9,714,528 B2 7/2017 Van Balen
9,970,217 B2 5/2018 Moock et al.
10,062,250 B2 8/2018 Grant et al.
10,176,345 B2 1/2019 Sedon
10,227,796 B2 3/2019 Moock et al.
10,323,440 B1* 6/2019 Kelsch ............... G08B 13/2434
10,492,322 B1* 11/2019 Fan ...................... H05K 7/1401
10,793,080 B2* 10/2020 Zhang .................... H04B 1/082
10,803,718 B2 10/2020 Sankey
11,015,626 B2* 5/2021 Leyden ............... E05B 73/0082
11,293,202 B2 4/2022 Moock et al.
11,319,731 B1* 5/2022 Kelsch ................ E05B 73/0082
11,401,738 B1 8/2022 Kelsch et al.
11,753,852 B2 9/2023 Moock et al.
11,952,803 B1* 4/2024 Kelsch ................ E05B 73/0023
11,993,959 B2* 5/2024 Kelsch ................ E05B 73/0082
12,012,781 B2* 6/2024 Grant .................. E05B 73/0017
12,049,981 B2 7/2024 Horvath
2004/0177658 A1 9/2004 Mtchell
2006/0066438 A1 3/2006 Altounian et al.
2006/0215836 A1 9/2006 Wang
2006/0233601 A1 10/2006 Crain et al.
2007/0145211 A1 6/2007 Marsilio et al.
2007/0215766 A1 9/2007 Yen
2008/0042020 A1 2/2008 Laitila et al.
2008/0169923 A1 7/2008 Belden et al.
2008/0196457 A1 8/2008 Goldman
2008/0209965 A1 9/2008 Maack
2008/0266089 A1 10/2008 Haren et al.
2008/0276672 A1 11/2008 Gartner
2009/0058643 A1 3/2009 Groth
2009/0158423 A1 6/2009 Orlassino et al.
2009/0166483 A1 7/2009 Marsilio et al.
2009/0189033 A1 7/2009 Lin
2010/0008028 A1 1/2010 Richardson
2010/0060410 A1 3/2010 Wirth
2010/0079285 A1 4/2010 Fawcett et al.
2010/0108828 A1 5/2010 Yu et al.
2010/0124005 A1 5/2010 Hotary et al.
2010/0147041 A1 6/2010 Teicher et al.
2010/0214469 A1 8/2010 Duncan
2010/0301998 A1 12/2010 Marszalek et al.
2011/0068906 A1 3/2011 Shafer et al.
2011/0068921 A1 3/2011 Shafer
2011/0080137 A1 4/2011 Avganim
2011/0100073 A1 5/2011 Johnston et al.
2011/0102179 A1 5/2011 Ezzo et al.
2011/0174937 A1 7/2011 Sullivan
2011/0187531 A1 8/2011 Oehl et al.
2011/0303709 A1 12/2011 Wizikowski
2012/0019383 A1 1/2012 Fawcett et al.
2012/0020046 A1 1/2012 Takashima
2012/0026684 A1 2/2012 Matthews
2012/0033375 A1 2/2012 Madonna et al.
2012/0080577 A1 4/2012 McIntyre et al.
2012/0118770 A1 5/2012 Valls et al.
2012/0126083 A1 5/2012 Nemoto
2012/0175474 A1 7/2012 Barnard et al.
2012/0182146 A1 7/2012 Berglund et al.
2012/0182680 A1 7/2012 Wetzel et al.
2012/0234055 A1 9/2012 Bland, III et al.
2012/0268103 A1 10/2012 Henson et al.
2012/0268275 A1 10/2012 Brenner
2012/0273630 A1 11/2012 Gillespie-Brown et al.
2012/0278907 A1 11/2012 Wehrenberg
2012/0293330 A1 11/2012 Grant et al.
2012/0297575 A1 11/2012 Garcia
2012/0312936 A1 12/2012 Huang
2013/0026322 A1 1/2013 Wheeler et al.
2013/0026324 A1 1/2013 Fischer et al.
2013/0058023 A1 3/2013 Supran et al.
2013/0067967 A1 3/2013 Olear et al.
2013/0078855 A1 3/2013 Hornick et al.
2013/0106592 A1 5/2013 Morgan et al.
2013/0107449 A1 5/2013 Su et al.
2013/0109253 A1 5/2013 Gammon et al.
2013/0120139 A1 5/2013 Chen
2013/0126688 A1 5/2013 Li et al.
2013/0134284 A1 5/2013 Hu et al.
2013/0135095 A1 5/2013 Stochita
2013/0135803 A1 5/2013 Johnson et al.
2013/0169434 A1 7/2013 McCown et al.
2013/0228570 A1 9/2013 Tseng
2013/0240587 A1* 9/2013 Buchhalter ......... B60R 11/0241
224/570
2013/0255336 A1 10/2013 Desai et al.
2013/0318937 A1 12/2013 Takeuchi et al.
2014/0013810 A1 1/2014 Brobst et al.
2014/0053185 A1 2/2014 Bleacher
2014/0060218 A1 3/2014 Bisesti et al.
2014/0118930 A1 5/2014 Sedon
2014/0130554 A1 5/2014 Su
2014/0168884 A1 6/2014 Wylie
2014/0203156 A1 7/2014 Stener
2014/0266725 A1 9/2014 Berglund et al.
2014/0362517 A1 12/2014 Moock et al.
2014/0366164 A1 12/2014 Hoefgen et al.
2016/0201359 A1 7/2016 Berglund et al.
2016/0335859 A1 11/2016 Sankey
2016/0335860 A1 11/2016 Richardson et al.
2017/0107742 A1 4/2017 Moock et al.
2017/0245663 A1 8/2017 Berglund et al.
2018/0258669 A1 9/2018 Moock et al.
2019/0122009 A1 4/2019 Sedon
2019/0178010 A1 6/2019 Moock et al.
2020/0141159 A1 5/2020 Berglund et al.
2020/0250351 A1 8/2020 Sedon
2020/0347648 A1 11/2020 Moock et al.
2021/0059437 A1* 3/2021 Chapuis ................. F16M 11/04

(56) References Cited

U.S. PATENT DOCUMENTS

| | | | |
|---|---|---|---|
| 2021/0381282 A1 | 12/2021 | Grant et al. |
| 2022/0262181 A1 | 8/2022 | Helman et al. |
| 2022/0268061 A1 | 8/2022 | Kelsch et al. |
| 2023/0407684 A1 | 12/2023 | Moock et al. |
| 2025/0067089 A1 | 2/2025 | Kelsch et al. |
| 2025/0067090 A1 | 2/2025 | Kelsch et al. |

FOREIGN PATENT DOCUMENTS

| | | |
|---|---|---|
| WO | 2013/023091 A2 | 2/2013 |
| WO | 2014/078966 A1 | 5/2014 |
| WO | 2015/026918 A1 | 2/2015 |

OTHER PUBLICATIONS

Archelon, "Archelon Keep Your Tablets Safe", Dec. 3, 2011, pp. 1-2.
Ewan, "iPad Enclosures to Help Lock-Down iPads for Public Use", "Mobile Industry Review News and Opinion for Industry Executives and Mobile Fanatics", Feb. 6, 2011, pp. 1-6.
Armor Active, "Locking iPad 2 Kiosk Tradeshow Exhibit". May 2011, pp. 1-4.
David Everson, "Mobile Technologies Inc, and the Enterprise Tablet Pro", Mobile Technologies Inc., Aug. 15, 2013, pp. 1-2.
"J-Plug", Multplx, 2012, 11 pages, London, England.
"J-Plug Splitter Alarm & Charging", Multplx, 2012, 2 pages, London, England.
Shane Thomas, Notification of Transmittal of the International Search Report and the Written Opinion of the International Searching Authority, or the Declaration for International Patent Application No. PCT/US2014/041664, Mar. 18, 2015, pp. 1-9, United States Searching Authority, Alexandria, Virginia USA.
Armoractive, [iPad] enclosures; see website at www.ipadenclosures.com; printed Oct. 9, 2013; 5 pages; Salt Lake City, Utah, USA.
Us+U Exclusive Swivel Cases for iPad 2nd/3rd Gen & Kindle Fire; see website at www.ipadincanada.ca; printed Jun. 11, 2013; 12 pages; Canada.
Tether Tools; TabStrap featuring BlackRapid; see website at www.shop.tethertools.com; printed Jun. 11, 2013; 2 pages; Phoenix, AZ, USA.
First Office Action from corresponding Chinese patent application No. 201480033180.1, dated Jul. 4, 2017 (8 pages).
Extended European Search Report from corresponding European Patent Application No. 14850527.4, dated Feb. 9, 2017 (7 pages).
Reissue Patent No. US RE44,433, dated Aug. 13, 2013.
Shopguard Systems Limited; Brochure; printed on Oct. 16, 2024.
PCT/2025/020697 International Search Report and Written Opinion; Jun. 10, 2025; US.

* cited by examiner

SECURITY DEVICE

CROSS REFERENCE TO RELATED APPLICATIONS

This application claims benefit of priority to U.S. Provisional Application No. 63/654,456, filed on May 31, 2024, and U.S. Provisional Application No. 63/764,087, filed on Feb. 27, 2025, the entire disclosures of which are incorporated herein by reference.

BACKGROUND OF THE INVENTION

Embodiments of the present invention relate generally to security devices for protecting items of merchandise from theft, such as consumer electronics products.

It is common practice for retailers to provide demonstration models of consumer electronics products, such as handheld devices, tablets, and laptop computers, so that a potential purchaser may examine the product more closely and test the operation of its features prior to making a purchase. A working demonstration model, however, increases the possibility that the demonstration model will be stolen or removed from the display area by an unauthorized person. As a result, demonstration models of consumer electronics products are typically protected by a security device that permits a potential purchaser to examine and operate the product, while reducing the likelihood that the demonstration model will be stolen or removed from the display area.

Certain consumer electronics products are more difficult to protect than others. For example, hand-held devices and tablets are relatively small and have different sizes which make one-size-fits all security devices more difficult. In addition, some security devices are cumbersome and limit the ability of the consumer to fully appreciate the features of the product.

SUMMARY OF THE INVENTION

In one embodiment of the invention, a security device for securing an item of merchandise from theft is provided. The security device includes a bracket assembly comprising a plurality of arms configured to engage the item of merchandise. At least one of the plurality of arms configured to move between an engaged position and a disengaged position. The security device also includes a housing operably engaged with the bracket assembly and configured to be secured to a display support for displaying the item of merchandise. The security device further includes an actuation mechanism operably engaged with the housing and the bracket assembly. The actuation mechanism is configured to actuate the at least one of the plurality of arms between the disengaged position and the engaged position, the item of merchandise being secured to the housing in the engaged position. In addition, the actuation mechanism is configured to be actuated via an electronic key for moving the at least one of the plurality of arms from the engaged position to the disengaged position to allow the item of merchandise to be removed from the housing. The actuation mechanism is also configured to be automatically deactuated in response to engagement of the at least one of the plurality of arms with the item of merchandise.

In another embodiment, a security device includes a plurality of arms configured to engage the item of merchandise, wherein at least one of the plurality of arms is configured to move between an engaged position and a disengaged position. The security device also includes a housing operably engaged with the plurality of arms and configured to be secured to a display support for displaying the item of merchandise. Moreover, the security device includes at least one motor operably engaged with the housing and the plurality of arms, wherein the at least one motor is configured to actuate the at least one of the plurality of arms between the disengaged position and the engaged position, and wherein the item of merchandise is secured to the housing in the engaged position. The at least one motor is configured to be activated for moving the at least one of the plurality of arms from the engaged position to the disengaged position to allow the item of merchandise to be removed from the housing. The at least one motor is configured to be automatically deactivated in response to engagement of the at least one of the plurality of arms with the item of merchandise.

In another embodiment, a method for securing an item of merchandise from theft is provided. The method includes actuating at least one of a plurality of arms from a disengaged position to an engaged position with an item of merchandise, wherein the item of merchandise is unable to be removed from the housing with the at least one of the plurality of arms in the engaged position and is able to be removed from the housing with the at least one of the plurality of arms in the disengaged position. The method further includes automatically deactuating the at least one of the plurality of arms in response to engagement of the at least one of the plurality of arms with the item of merchandise. In addition, the method includes actuating the at least one of the plurality of arms in response to communication with an electronic key for moving the plurality of arms from the engaged position to the disengaged position to allow the item of merchandise to be removed from the housing.

In another embodiment, a security device includes a bracket assembly comprising a plurality of arms configured to engage the item of merchandise, wherein at least one of the plurality of arms is configured to move between an engaged position and a disengaged position. The security device also includes a housing operably engaged with the bracket assembly and configured to be secured to a display support for displaying the item of merchandise. The security device further includes an actuation mechanism (e.g., a lock mechanism) operably engaged with the housing and the bracket assembly. The actuation mechanism is configured to actuate the at least one of the plurality of arms between the disengaged position and the engaged position (e.g., via one or more motors, detection of the item of merchandise, etc.) such that the item of merchandise is secured to the housing in the engaged position (e.g., a locked position). The actuation mechanism is configured to be actuated for moving the at least one of the plurality of arms from the engaged position to the disengaged position (e.g., via an electronic key such as a mobile device) to allow the item of merchandise to be removed from the housing (e.g., an unlocked position). The actuation mechanism is configured to be automatically actuated or deactuated in response to engagement of at least one of the plurality of arms or the housing with the item of merchandise (e.g., via detection of motor current, sensor input, detection of the item of merchandise, etc.).

BRIEF DESCRIPTION OF THE DRAWING FIGURES

DETAILED DESCRIPTION OF EMBODIMENTS OF THE INVENTION

Figure 1:
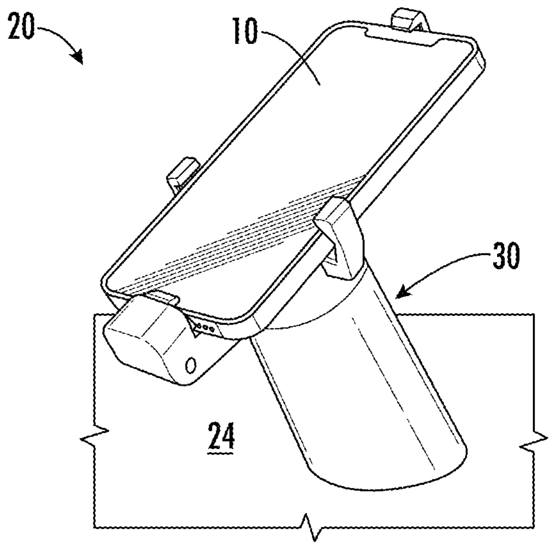
FIG. 1 is a perspective view of a security device for securing an item of merchandise from theft according to one embodiment of the present invention.

Referring to the accompanying figures wherein identical reference numerals denote the same elements throughout the various views, embodiments of security devices and systems according to the present invention for protecting an item of merchandise against theft or unauthorized removal are illustrated. Dashed lines shown in the figures may represent hidden internal elements.

Figure 15:
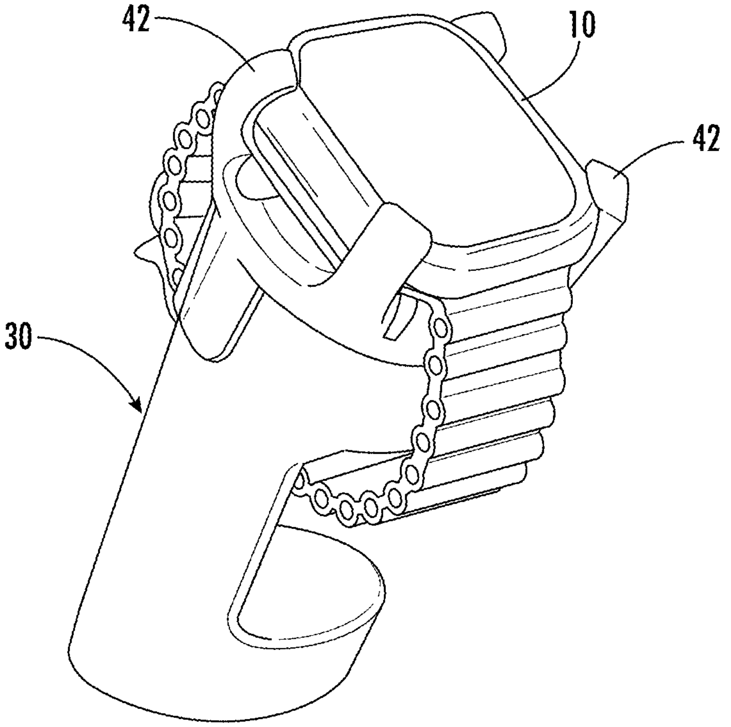
FIG. 15 is another perspective view of the security device shown in FIG. 11 securing an item of merchandise.
Figure 16:
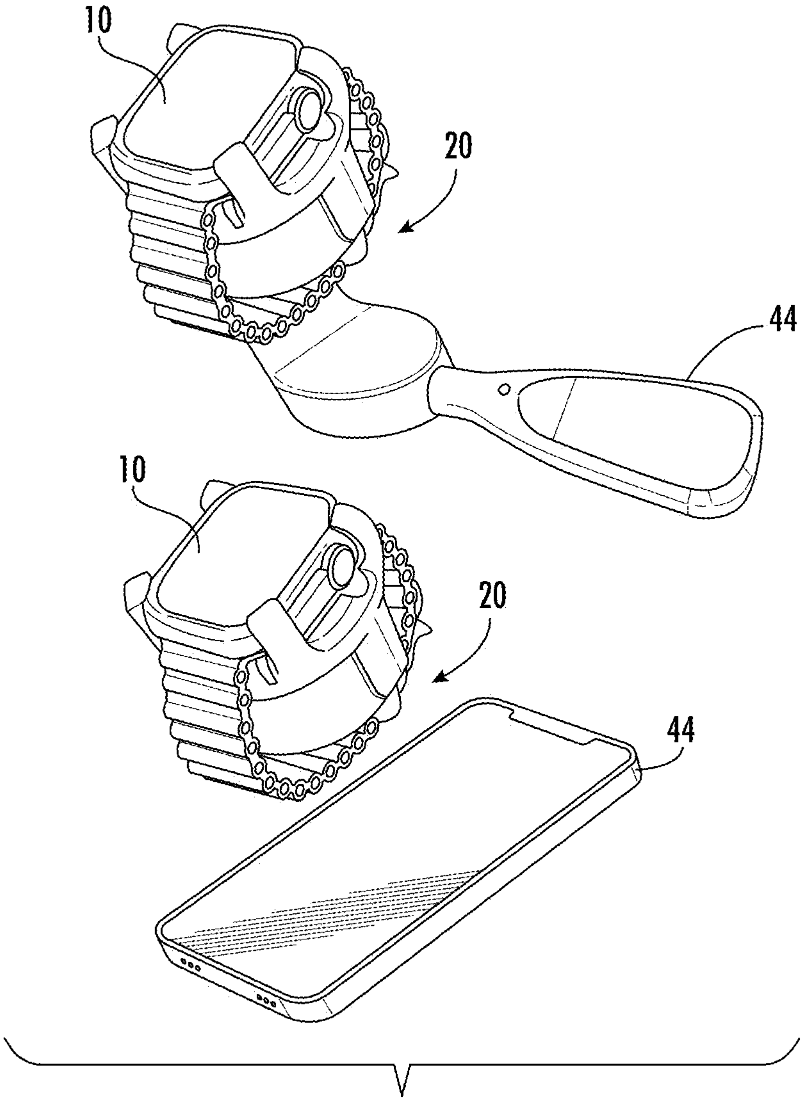
FIG. 16 shows perspective views of security devices for securing a wearable device in communication with an electronic key according to various embodiments.

The item of merchandise 10 may be any item, including any number of consumer electronics products (e.g. handheld device, cellular phone, smart phone, tablet, laptop computer, etc.). For example, FIG. 1 shows an item of merchandise 10 in the form of a cellular phone, while FIG. 15 shows a wearable device. Embodiments of a security device, indicated generally at 20, are operable for securing the item of merchandise and permit a potential purchaser to examine and test the item of merchandise, while reducing the likelihood that the item of merchandise, or a removable component of the item of merchandise, will be stolen or removed from the display area by an unauthorized person. Although described in relation for use in a retail environment, the security devices 20 shown and described herein is suitable for engaging and securing a variety of items in variety of other environments, such as a residential or commercial environment, and therefore, is not intended to be limited to use only as a security display device for protecting against theft and/or unauthorized removal.

Figure 17:
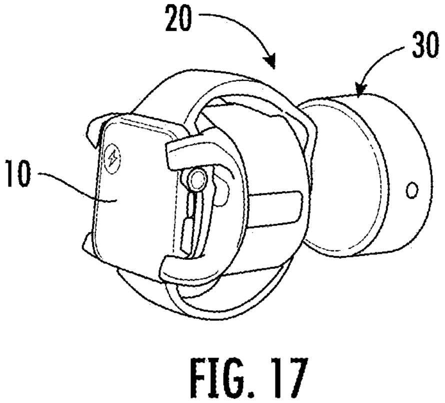
FIG. 17 is a perspective view of a security device for securing an item of merchandise from theft according to another embodiment of the present invention.

As shown in one embodiment according to FIGS. 1-4, the security device 20 comprises a housing 30. The housing 30 is configured to be coupled to the item of merchandise 10. For example, the housing 30 may be configured to be fixed to a display surface 24, support, fixture, wall, cabinet, or the like, such as with adhesives and/or fasteners. For example, the housing 30 may be secured to a display surface 24 with a fastener that is configured to extend through the display surface and engage the housing 30. The housing 30 may be additionally secured to the display surface 24 with an adhesive if desired. In an alternative embodiment, the housing 30 may be configured to be mounted to a wall (see, e.g., FIG. 17).

It is understood that the housing 30 may take on many different configurations and include various alternative features. For example, each of the embodiments in the figures show that the housing 30 may take on different forms depending on the type of item of merchandise 10 (e.g., compare FIGS. 1-3 for a handheld device vs. FIGS. 11-15 for a wearable device). In some cases, the housing 30 mechanically secures the item of merchandise 10 without any sensing electronics configured to detect removal of the item. In other embodiments, the housing 30 may include a sensor configured to detect unauthorized detachment of the item of merchandise 10 from the housing and/or unauthorized removal of the item of merchandise from the sensor. The sensor may be fixed to the item of merchandise 10 using an adhesive or any other suitable technique. Should the sensor be removed without being disarmed, the sensor may be configured to detect the unauthorized removal (e.g., via a pressure switch) and facilitate generation of a security signal (e.g., an audible, visible, and/or haptic signal). For example, the security device 20 may include an alarm in communication with the sensor and be configured to generate a security signal in response to unauthorized removal of the item of merchandise 10 from the housing 30. Other optional features of the security device 20 include a tether coupled to the housing 30. The tether may be used to mechanically secure the housing 30 to a display surface 24. The tether may be further coupled to a recoiler for allowing the length of the tether to be adjusted relative to the housing 30. In addition, the tether could be utilized to transfer power to the item of merchandise 10. For example, an external power source or an internal power source within the housing 30 may transmit power through the tether, and a power cord engaged with an input port on the item of merchandise 10 may be electrically coupled to the tether. Likewise, a power cord may be connected directly between the housing 30 or an external power source and the input port of the item of merchandise 10 for providing power thereto.

Figure 2:
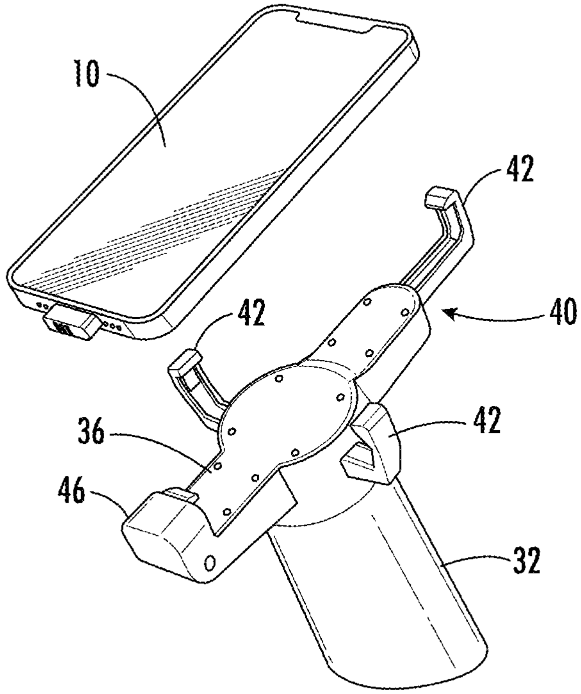
FIG. 2 is another perspective view of the security device shown in FIG. 1 with the item of merchandise removed.
Figure 3:
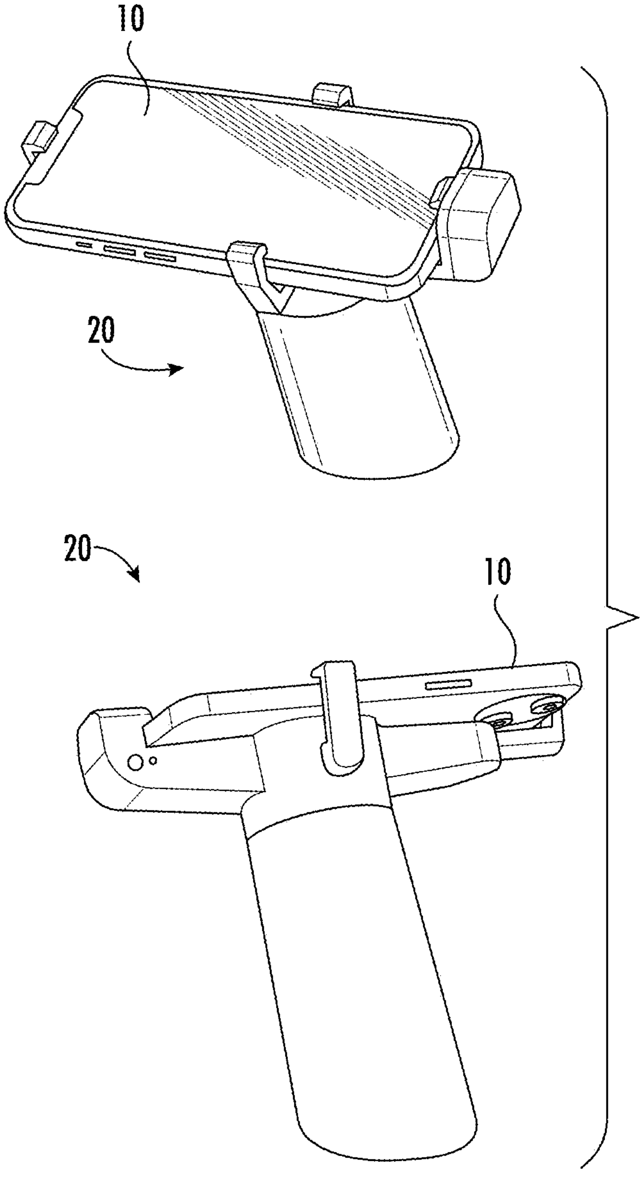
FIG. 3 illustrates front and rear perspective views of the security device shown in FIG. 1 demonstrating the ability of the item of merchandise to be displayed in different orientations.
Figure 5:
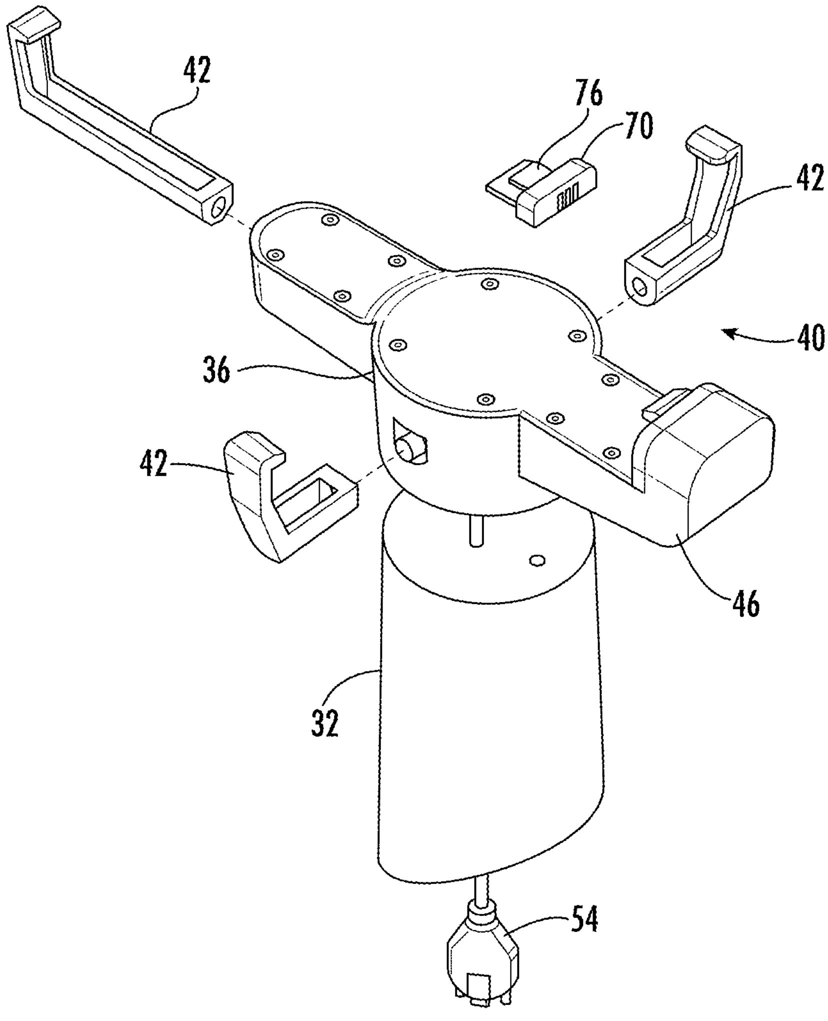
FIG. 5 is an exploded perspective view of a security device according to one embodiment of the present invention.

In other embodiments, the housing 30 comprises a bracket assembly 40 configured to releasably engage the item of merchandise 10 (see, e.g., FIG. 2). In this regard, the bracket assembly 40 may include one or more arms 42 configured to engage the item of merchandise 10, such as in a locked or engaged position whereby the item of merchandise cannot be removed from the housing 30. Conversely, the arms 42 may be configured to move from the locked or engaged position to an unlocked or disengaged position whereby the item of merchandise 10 is able to be removed from the housing 30. At least one of the arms 42 may be adjustable with respect to the item of merchandise 10 so that various sized items may be accommodated. The arms 42 could be adjusted in a lateral direction (e.g., in a X or Y-direction) with respect to the item of merchandise 10 to account for items having various lengths and widths and/or adjusted vertically (e.g., in a Z-direction) to account for items having various thicknesses. Furthermore, the arms 42 may be interchangeable with arms of various sizes for accommodating different sized items of merchandise 10. As will be understood, the arms 42 may be any desired shape and configuration for engaging and securing an item of merchandise 10. For instance, comparing the illustrated embodiments for security devices 20 for different types of items of merchandise 10 shows that the arms 42 may vary depending on the type of merchandise (e.g., handheld vs. wearable device). In the particular embodiment shown in FIG. 2, four arms 42 are shown, although any number of arms may be used in other embodiments (see, e.g., FIGS. 11-14 where a pair of arms are employed). The arms 42 may have any desired shape that secures the item of merchandise 10 to the housing 130. In one example, the ends of the arms 42 have a C-shape for extending around the lateral edges of the item of merchandise 10. Thus, when secured by the arms 42 in a locked configuration, the item of merchandise 10 cannot be removed without first unlocking or otherwise disengaging one or more of the arms. FIGS. 11-17 and 21-26 show that for a wearable device in some embodiments, each arm 42 may be configured to engage at least a pair of corners on each side of the wearable device. Moreover, FIG. 5 shows an example where the housing 30 is integrally formed with the fixed arm 46 and is configured to extend along a rear surface of the item of merchandise 10. Moreover, in some cases, the arms 42 may be interchangeable depending on the type of item of merchandise 10. For instance, in the case of a wearable device, the arms 42 may be swappable with different sized and shaped arms depending on the particular model of the wearable device.

Figure 8:
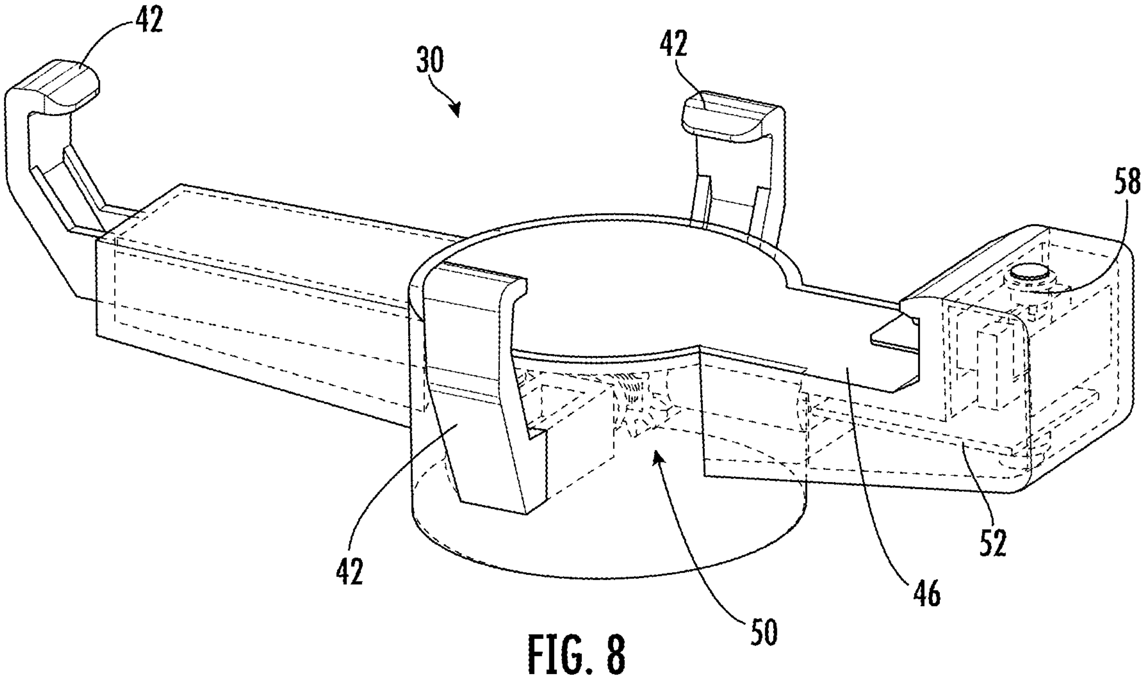
FIG. 8 shows a perspective view of a housing including a bracket assembly according to one embodiment of the present invention.
Figure 9:
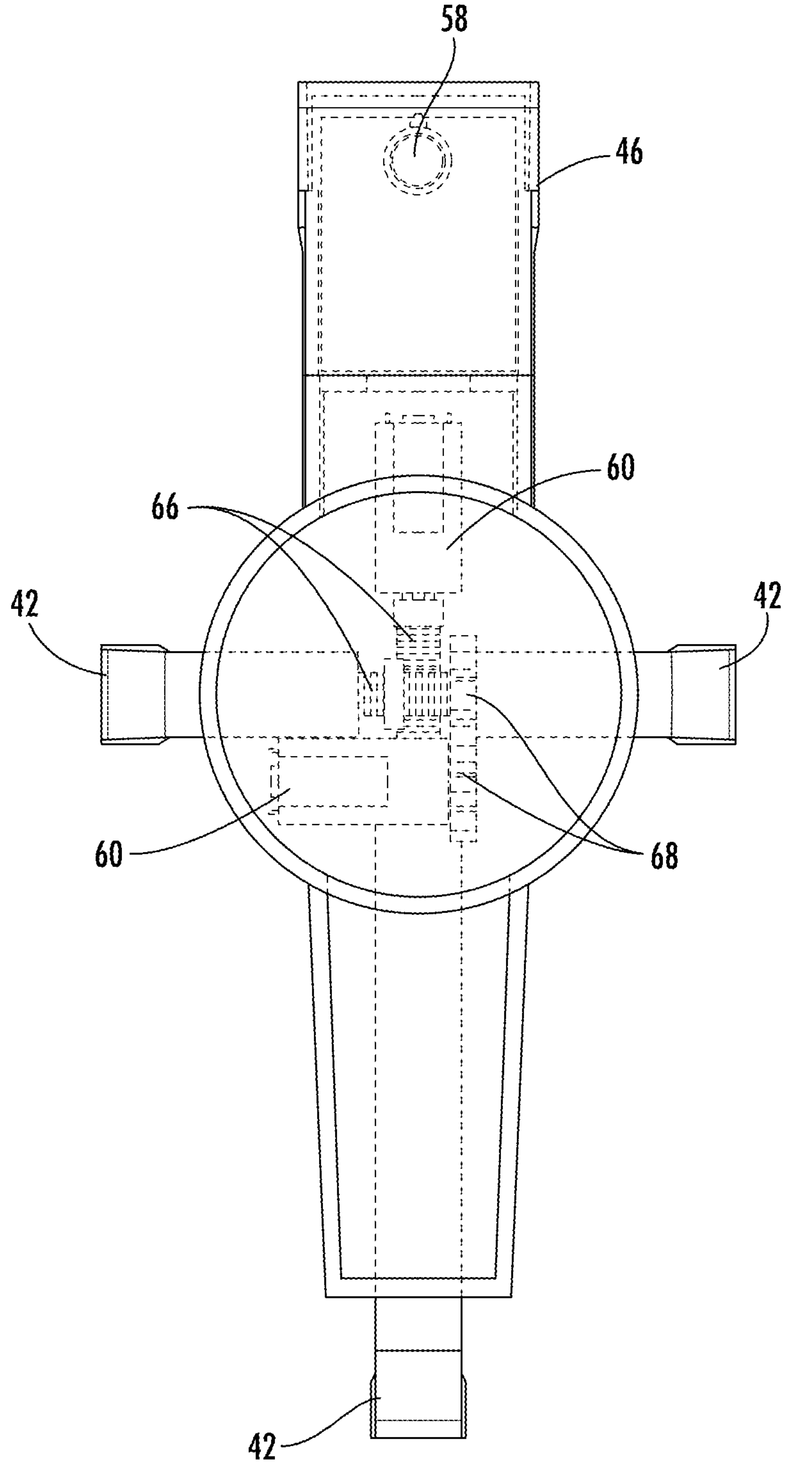
FIG. 9 is a plan view of the housing shown in FIG. 8.
Figure 10:
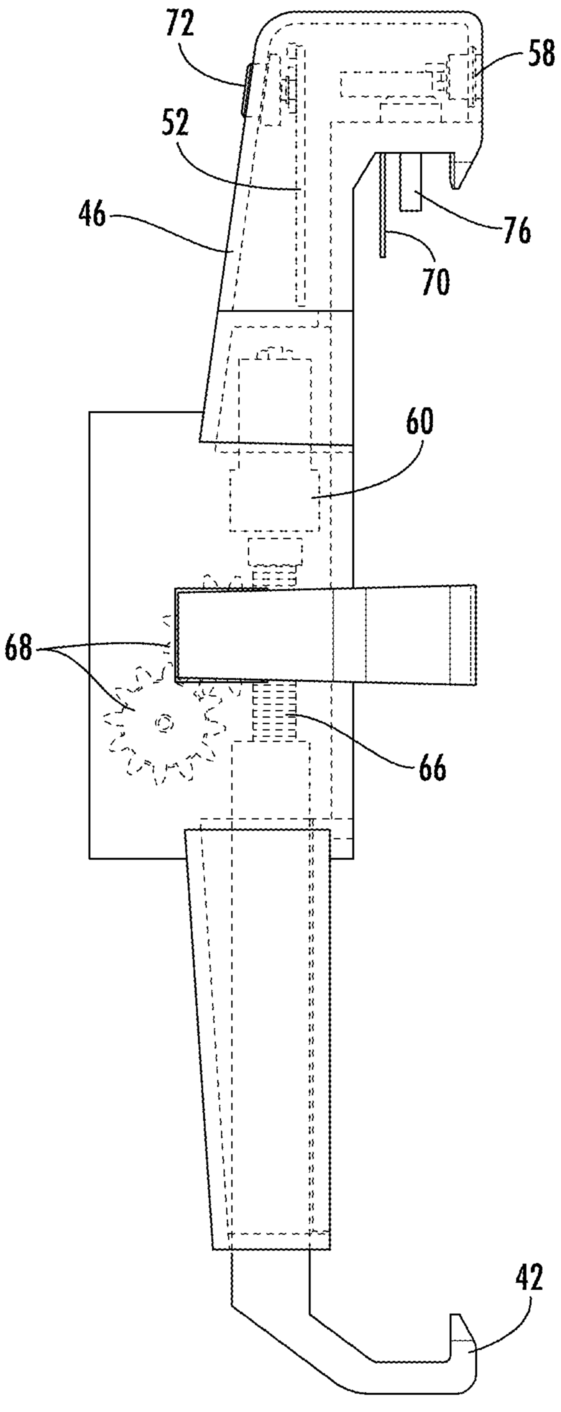
FIG. 10 is a side view of the housing shown in FIG. 8.
Figure 18:
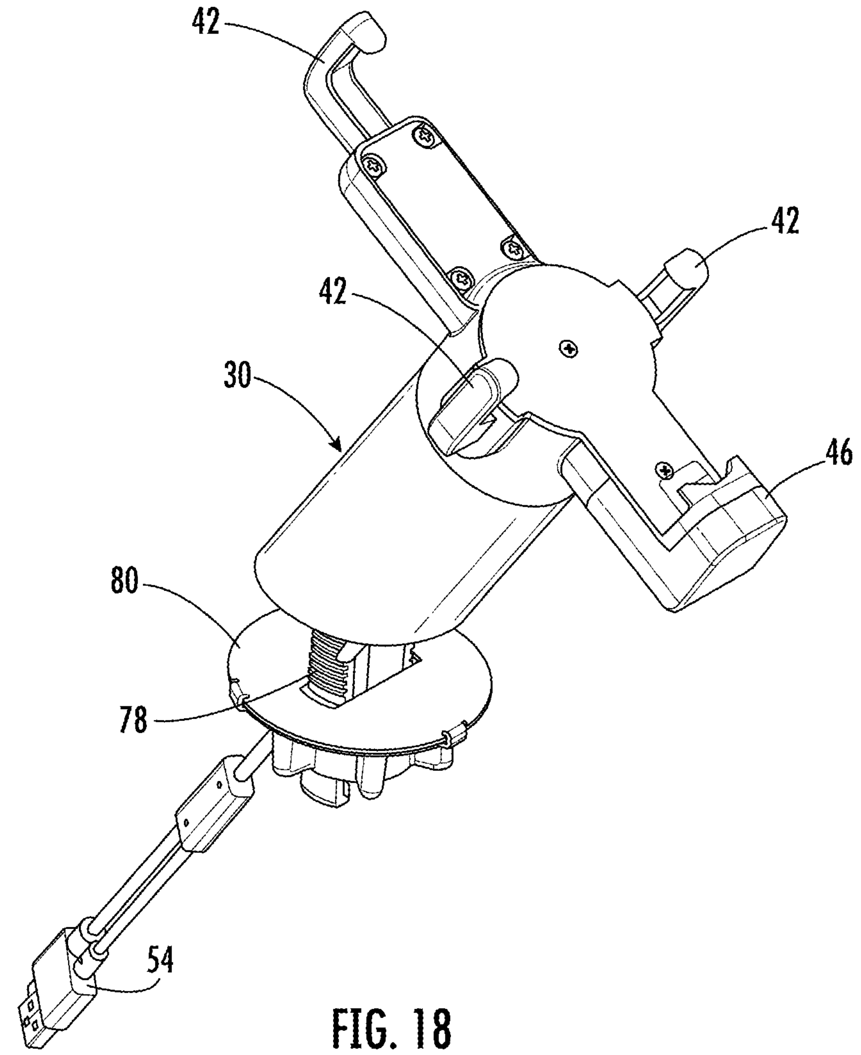
FIG. 18 is a perspective view of a security device for securing an item of merchandise from theft according to another embodiment of the present invention.
Figure 19:
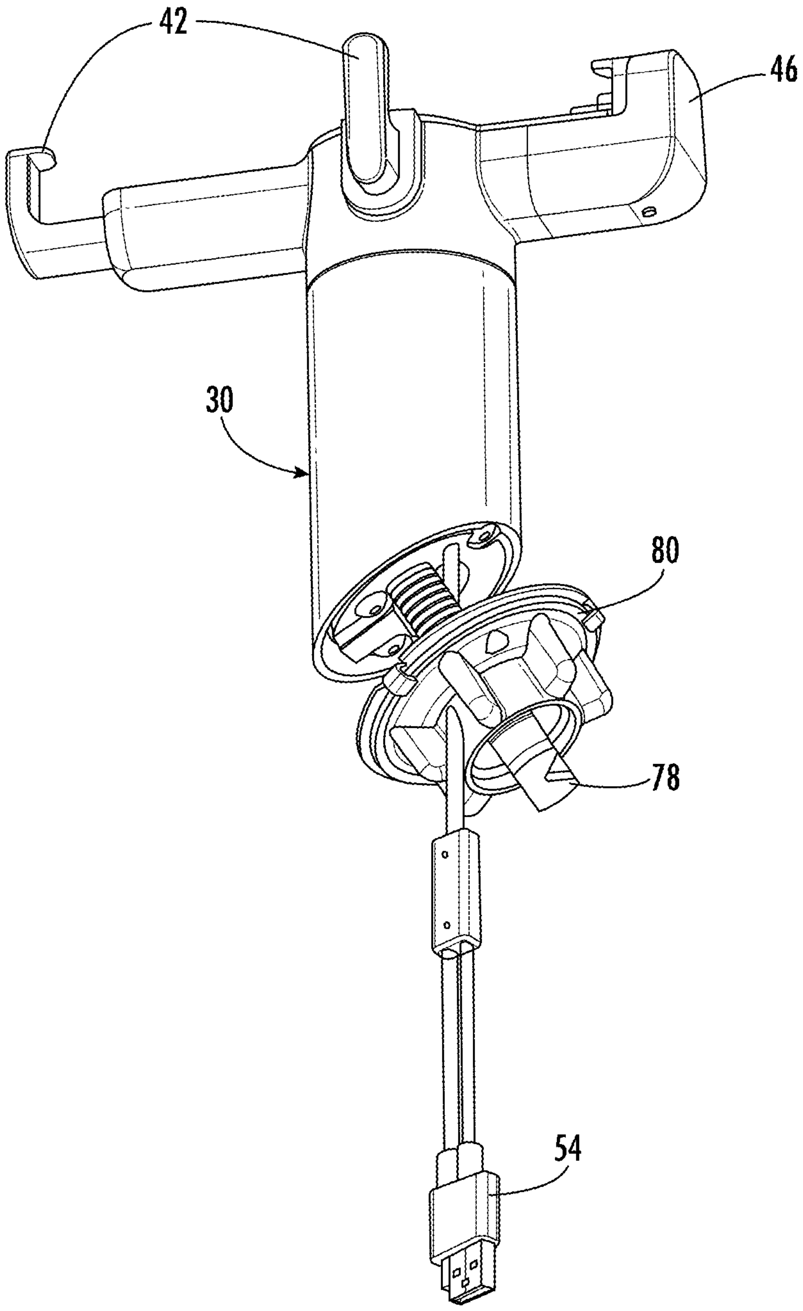
FIG. 19 is a rear perspective view of the security device shown in FIG. 18.
Figure 20:
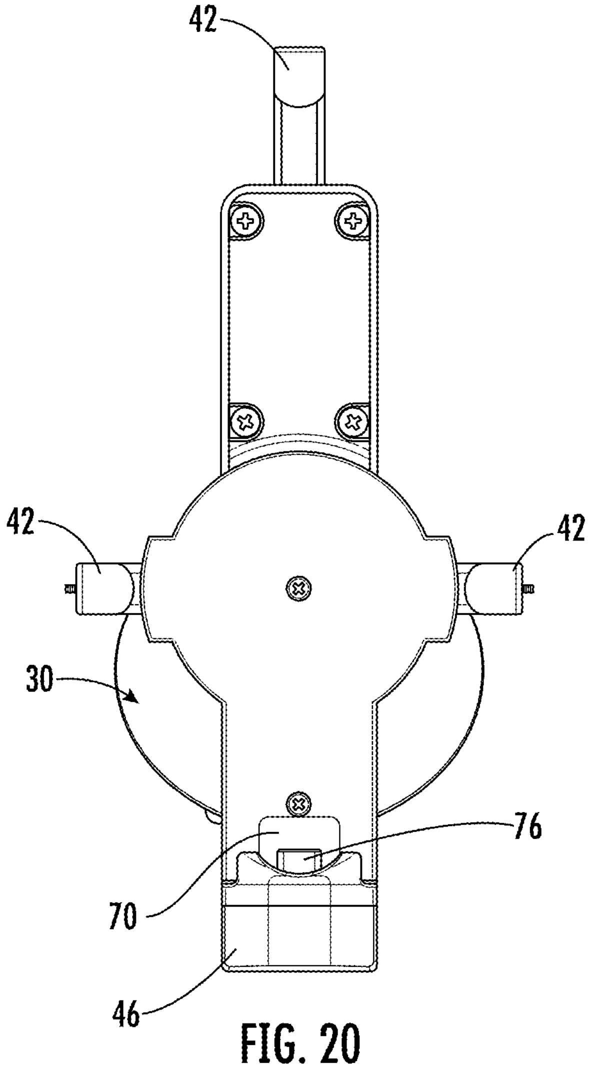
FIG. 20 is a plan view of the security device shown in FIG. 18.
Figure 21:
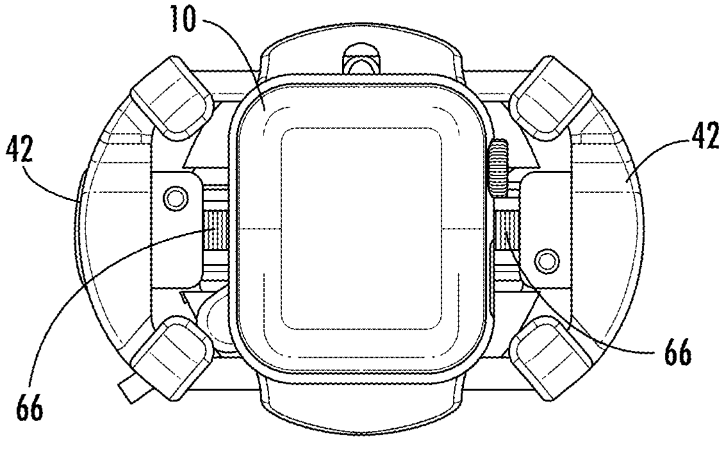
FIG. 21 is a plan view of a security device for securing an item of merchandise from theft in a disengaged position according to another embodiment of the present invention.
Figure 22:
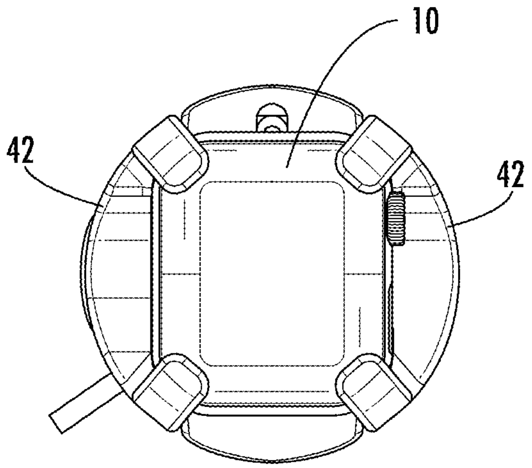
FIG. 22 is another plan view of the security device shown in FIG. 21 in an engaged position.
Figure 23:
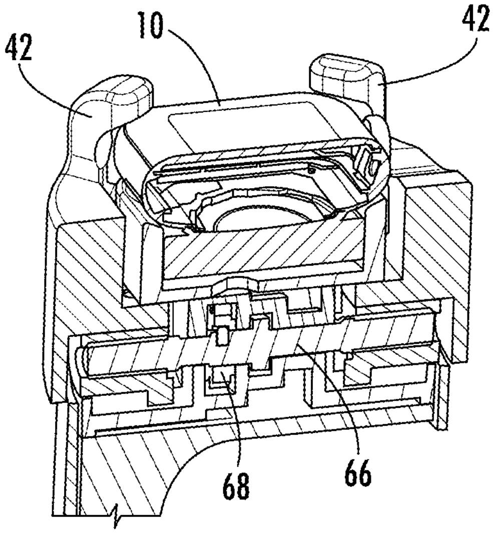
FIG. 23 is a cross-sectional view of the security device shown in FIG. 21 in an engaged position.
Figure 24:
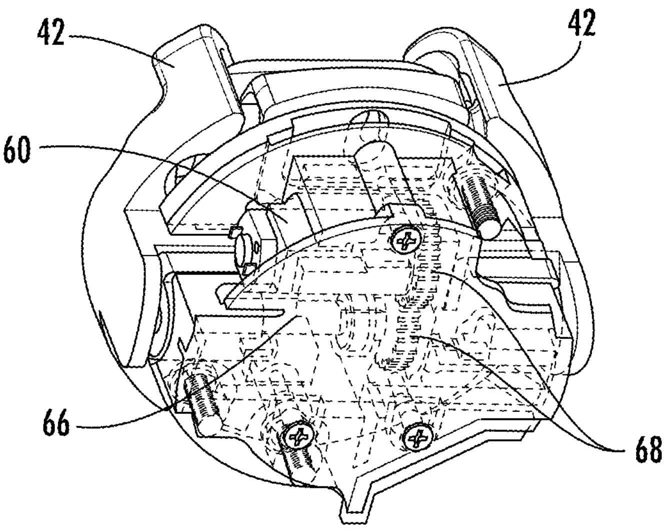
FIG. 24 is a bottom perspective view of the security device shown in FIG. 21 in an engaged position.
Figure 25:
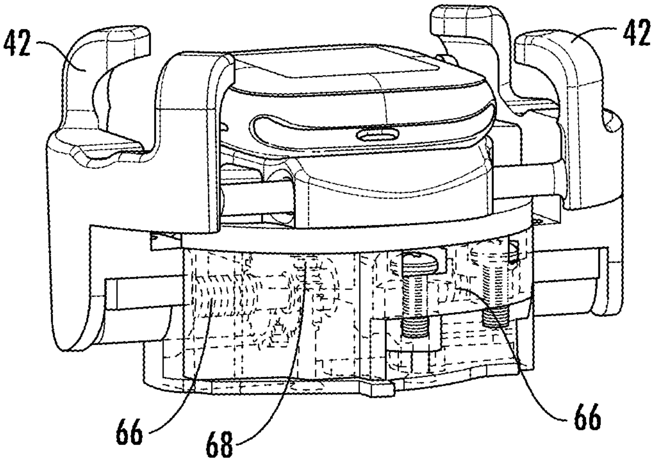
FIG. 25 is a side perspective view of the security device shown in FIG. 21 in a disengaged position.
Figure 26:
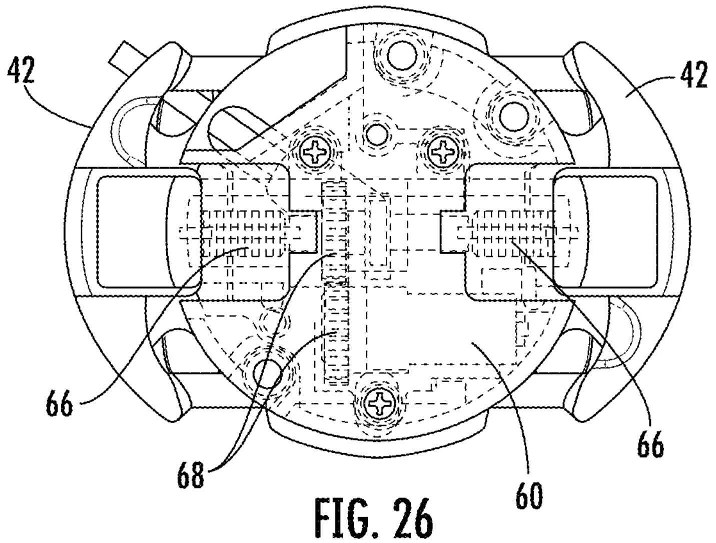
FIG. 26 is another plan view of the security device shown in FIG. 26 in a disengaged position.

In one example embodiment, FIG. 5 shows a housing 30 having a plurality of arms 42 adjustable relative to the housing, while one of the arms 46 is fixed in place and is not adjustable (see also, FIGS. 18-20). In some cases, the fixed arm 46 is integrally formed with the housing 30, while in other cases the fixed arm could be attached to the housing at a desired position. In other embodiments, the fixed arm 46 may be adjustable relative to the housing to account for different items of merchandise 10 (e.g., via a tool or toolless, such as a fastener, automatic mechanism, ratchet mechanism, etc.). The fixed arm 46 may include a connector 70 as explained in further detail below that may be used to electrically connect to the item of merchandise 10. The other arms 42 may be adjustable relative to the housing 30. FIGS. 8-10 illustrate an example housing 30 whereby a plurality of motors 60 are employed for driving or adjusting a position of the arms 42. For instance, one motor 60 may be employed for moving a pair of arms 42 laterally (e.g., in an X-direction), while a second motor may be employed for moving another arm in a different lateral direction (e.g., a Y-direction). In one example, FIGS. 23-26 illustrate that a pair of arms 42 may be configured to move inwardly and outwardly relative to one another, and each arm may be operably engaged with a threaded rod 66. In some embodiments, the motor 60 may be configured to actuate the arms 42 using a variety of mechanisms, such as turnbuckles, threaded rods 66, and/or gears 68. For example, the motor 60 may be engaged with a threaded rod 66 or turnbuckle that is configured to move the arm 42 outwardly or inwardly depending on the direction of rotation of the motor (see, e.g., FIGS. 10 and 23). The motor 60 may be orientated co-axially to the arm 42 or could be in different orientations and utilize a plurality of gears 68 for moving a plurality of arms (see, e.g., FIGS. 9-10 and 24-25). Thus, in some cases, rotation of the motor 60 causes linear motion of one or more arms 42. Use of multiple motors 60 may allow for more adjustment travel of the arms 42 and/or the ability to account for different aspect ratios of different items of merchandise 10.

Of course, other mechanisms could be utilized for effectuating movement of the arms 42. For instance, the housing 30 may include a spiral drive plate, which may be a plate with spiral channels or ribs that interact with the arms 42 to drive them inward or outward from the center of the plate as the plate turns. Therefore, in some embodiments, a plurality of arms 42 (e.g., 2 or more, 3 or more, etc.) are configured to move together, which may occur simultaneously, and which may account for different aspect ratios of different items of merchandise 10. The spiral drive plate could be activated using a variety of means, such as a motor 60 or manually (e.g., via a tool). Furthermore, it is understood that the motor 60 may be used for various other purposes, such as combining all the unlocking into one motor drive action such that the arms 42 move, the upper portion 36 unlocks, and/or the fixed arm 46 becomes adjustable, all in the unlocked position of the motor.

In some embodiments, the security device 20 may utilize one or more sensors or mechanisms for activating or deactivating the motor(s) 60. In one embodiment, the motor 60 may be configured to deactuate or otherwise stop driving the arms 42 inward when they engage the item of merchandise 10 in the locked configuration and/or when the arms reach a predetermined distance in an unlocked configuration. One way to do this is to put sensor switches in each arm 42 for detecting the item of merchandise 10, e.g., the sensor switches may be configured to detect a respective arm and generate a signal to activate a motor 60. In another embodiment, the motor 60 may reside on a floating motor housing that is attached to a torsion spring. The spring may be strong enough to not turn while the arms 42 are still moving. But as soon as the arms 42 stop moving, the motor 60 torque may be transferred into the motor housing and then turn the torsion spring. The motor housing may spin through a certain angle until it hits a switch, which then triggers the motor 60 to shut off. This mechanism can work in both directions with the motor 60 turning either clockwise or counterclockwise from the torsion spring's free state condition, thus a switch could be placed on either side of the travel to indicate a closed or an open position. In another embodiment, another technique to determine when to deactuate or stop driving the motor 60 is to sense the motor current. When the arms 42 contact the item of merchandise 10 and stop moving, the motor 60 may stall and the motor current may spike. A motor controller may be configured to sense the spike in amperage and then turn off the motor 60. The spike could be softened with a torsion spring coupling between the gear motor shaft and the spiral drive. When the arms 42 contact the item of merchandise 10 and the spiral drive stops, the motor shaft would continue to turn a few degrees as the torsion spring loads. This would give the control system a longer period of time to sense the end of travel and possibly stop the motor 60 before it stalls. This could reduce the stress on the gear train of the motor 60. Another embodiment for determining when to deactivate or stop the motor 60 is to simply run the motor for a fixed period of time (e.g., three seconds, five seconds, etc.). When the arms 42 contact the item of merchandise 10, the motor 60 would stall. Moreover, a variety of sensors or switches could be employed to deactivate the motor 60 when the arms 42 reach a predetermined distance in the unlocked configuration, e.g., each arm may be configured to engage a limit switch. This may be useful to limit use of the motor 60 and/or to prevent the arms 42 from being completely removed from the housing 30. In some embodiments, the arms 42 may include a resilient material that is configured to contact the item of merchandise. For example, the resilient material could be in the form of rubber stops on the arms 42 in a location configured to contact the item of merchandise 10. In this way, the resilient material may be configured to be compressed to thereby provide the motor 60 time to determine whether to turn on or off, which may prevent damaging the motor.

Figure 11:
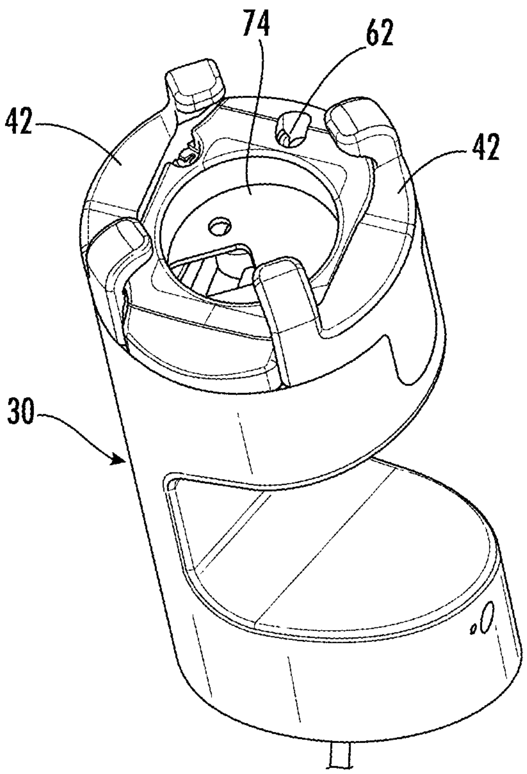
FIG. 11 is a perspective view of a security device for securing an item of merchandise from theft according to another embodiment of the present invention.
Figure 12:
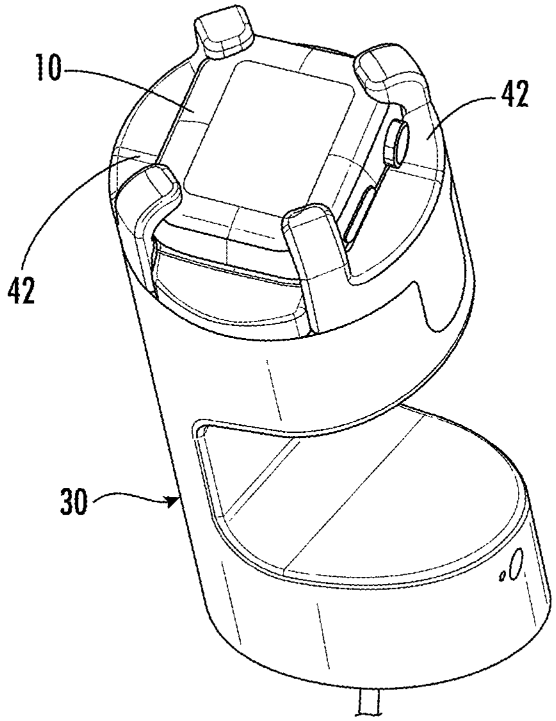
FIG. 12 is another perspective view of the security device shown in FIG. 11 securing an item of merchandise.
Figure 13:
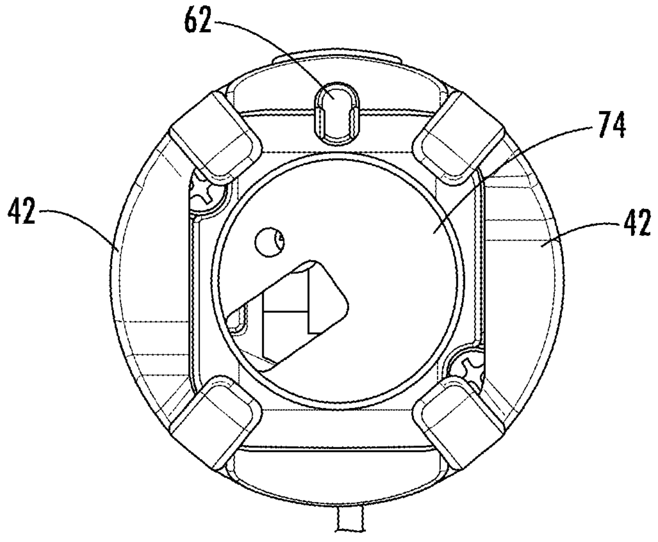
FIG. 13 is a top view of the security device shown in FIG. 11.

In yet another embodiment, proximity sensors may be employed to determine when to activate the one or more motors 60 or other mechanisms. For instance, one or more proximity sensors may be configured to detect the presence of the item of merchandise 10 when it is placed on or near the housing 30. For example, FIGS. 11-13, illustrate that a proximity sensor 62 may be located on the housing 30. In one case, when the item of merchandise is placed on the housing 30, a change in the signal generated or detected by the proximity sensor 62 as a result of the item being placed over the sensor or in proximity thereto may be used to direct when the lock mechanism 50 or one or more of its components are to be activated (e.g., to automatically activate one or more motors 60). It is understood that the proximity sensor 62 may be desired sensor configured to detect the presence of the item of merchandise 10, such as for example, a light, time of flight, optical infrared, Hall effect, or inductive sensor.

Figure 14:
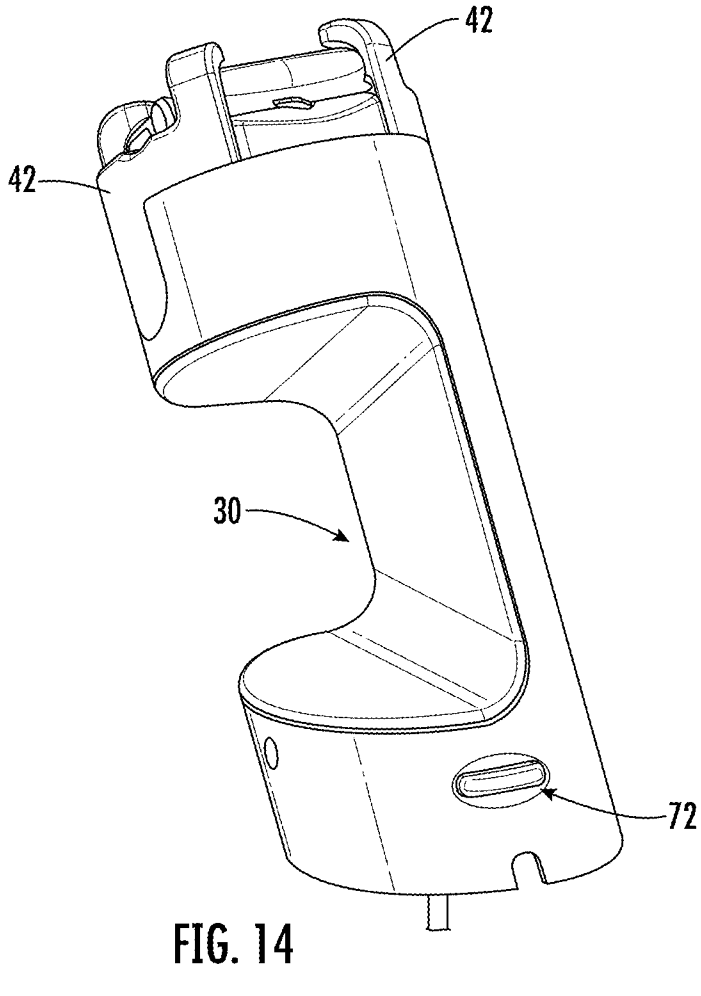
FIG. 14 is a rear perspective view of the security device shown in FIG. 11.

In other embodiments, the security device 20 may include an actuator 72 that is configured to actuated (e.g., via a pushbutton) for actuating the one or more arms 42 (see, e.g., FIGS. 10 and 14). For instance, actuation of the actuator 72 may send a signal to the one or more motors 60 to be activated such that the arms 4 are moved from the unlocked position to the locked position.

In the event a user wishes to replace the arms 42, the user may be configured to actuate the arms in a way that allows the arms to be completely removed from the housing 30. For instance, a key 44 may be used to communicate with the security device 20 in a setup mode to allow one or more of the arms 42 to be removed, e.g., by allowing the motor(s) 60 to actuate the arms beyond the predetermined location of the arms in the unlocked configuration.

Figure 4:
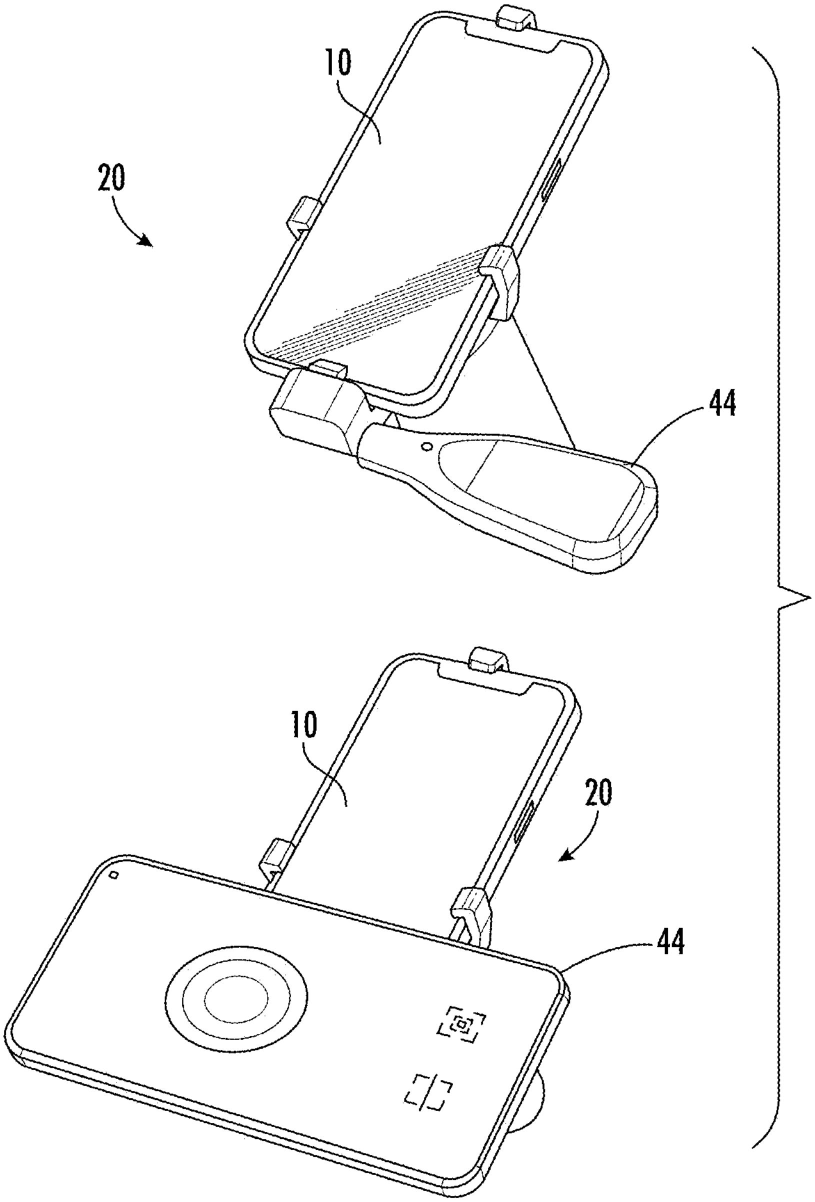
FIG. 4 shows additional perspective views of the security device shown in FIG. 1 in communication with an electronic key.

In one embodiment, the security device 20 may include a key 44 (see, e.g., FIG. 4). In one example, the key 44 is electronic and is configured to communicate with the security device 20 for locking and/or unlocking a lock mechanism 50 (described in greater detail below) using a unique identifying code. The security device 20 may be configured to wirelessly communicate with the key 44 containing a security code. In one embodiment, the key 44 is similar to that described in U.S. Pat. No. 7,737,845 and U.S. Patent Publication No. 2012/0047972, each of which is hereby incorporated by reference in its entirety herein. In other embodiments, the key 44 may be a mobile device (e.g., a cellular device, smartphone, scanner, tablet, etc.) configured to communicate with the security device 20 for operating the lock mechanism 50. In one embodiment, the key 44 is similar to that described in U.S. Publ. No. 2022/0262181, which is hereby incorporated by reference in its entirety herein. In one embodiment, the lock mechanism 50 is responsive to electrical power to facilitate unlocking of the lock mechanism. In some embodiments, the lock mechanism 50 may operating using electrical power transferred by a key 44, such as disclosed in U.S. Pat. No. 11,230,862, filed on Mar. 18, 2021, the disclosure of which is incorporated herein by reference in its entirety. In some example embodiments, different types of electronic keys 44 may be configured to control the security device 20 (see, e.g., FIGS. 4 and 16).

In some embodiments, the security device 20 may also include a lock mechanism 50. The lock mechanism 50 may be operably engaged with the housing 30 and is configured to lock and/or unlock the item of merchandise 10 to or within the housing, such as via the various embodiments discussed above. The lock mechanism 50 is operable to lock the item of merchandise 10 within or to the housing 30 in a locked configuration (see, e.g., FIGS. 1 and 3) and to allow the item of merchandise to be removed from the housing in an unlocked configuration (see, e.g., FIG. 2). In some examples, the lock mechanism 50 is a quick-release lock mechanism. As used herein, “quick release” may refer to actuation that allows the item of merchandise 10 to be readily removed from the security device 20 without the need to first remove one or more fasteners or otherwise disassemble the security device. For example, all that is needed in some cases to actuate the lock mechanism 50 is communication with a key 44. In one embodiment, the item of merchandise 10 is configured to be automatically removed at least partially from the housing 30 when the lock mechanism 50 is actuated to the unlocked configuration. Thus, when the lock mechanism 50 is actuated, the item of merchandise 10 may be partially extended out of the housing 30 so that a consumer or associate may readily remove the item from the housing. In some cases, it may not be desirable to at least partially remove the item of merchandise 10 from the housing 30 automatically. In this instance, when the lock mechanism 50 is unlocked, the associate may simply remove the item of merchandise 10 manually from the housing 30. In addition, when removed from the housing 30, the item of merchandise 10 may be readily handled by the consumer without any sensors, brackets, etc. attached to the item. Therefore, the consumer is able to handle the item of merchandise 10 without any impediments. To counter theft, a retail establishment may require an associate to unlock the lock mechanism 50 and accompany the consumer while the consumer examines the item of merchandise 10. When the consumer is finished examining the item of merchandise 10, the associate may then place the item in or on the housing 30 and re-secure the lock mechanism 50.

It is understood that the term “lock mechanism” is not intended to be limiting and may be any suitable mechanism, such as an actuation mechanism, configured to facilitate engagement with the item of merchandise 10 whereby the item of merchandise is incapable of being removed from the housing without authorization and disengagement from the item of merchandise whereby the item of merchandise is capable of being freely removed from the housing. For example, the lock mechanism 50 may take the form of an actuation mechanism that is configured to actuate one or motors as described above for moving one or more arms 42 between engaged and disengaged positions. In this way, the actuation mechanism is configured to "lock" the item of merchandise 10 to the housing 30 when engaged with the item of merchandise and to be "unlocked" when disengaged from the item of merchandise.

In some embodiments, the lock mechanism 50 is configured to be automatically actuated. For example, the motor(s) 60 may be configured to be automatically activated for moving the arms 42 into engagement with the item of merchandise 10 (e.g., in any one or more of X, Y, or Z directions). In some instances, the motor(s) 60 may be activated in response to actuation of a switch or other like sensor upon placement of the item of merchandise 10 in engagement with the housing 30, such as those disclosed herein. In additional embodiments, the arms 42 may be configured to be actuated in response to an electrical connection between the item of merchandise 10 and the housing 30, such as via engagement of the connector 70 with the input port of the item of merchandise 10. In one example, the security device 20 may include an accelerometer or other sensor configured to detect the orientation of the bracket assembly 40. For instance, the accelerometer or other sensor may be configured to detect if the bracket assembly 40 is in a portrait orientation prior to actuating the arms 42. In other cases, the arms 42 could be actuated manually in response to manual interaction as discussed above (e.g., a user selecting a button).

The lock mechanism 50 may be any suitable mechanism configured to lock the item of merchandise 10 to or in the housing 30. For example, the lock mechanism 50 may be configured to lock the arms 42 in a locked configuration to thereby secure the item of merchandise 10. It is understood that various locking mechanisms 50 could be utilized to secure the item of merchandise 10 to or in the housing 30, including various mechanical and/or electrical mechanisms. For example, the lock mechanism 50 may be comprised of one or more motors, turnbuckles, threaded rods, gears, other mechanisms, etc. that effectuate locking the one or more arms 42 in a fixed position.

In addition, although an electronic key 44 has been discussed herein, it is understood that other mechanisms may be used with the security device 20 to actuate the lock mechanism 50, including mechanical keys, magnetics, passwords, infrared communication, Bluetooth communication, NFC communication, biometrics, and the like. Furthermore, the lock mechanism 50 may be actuated to the locked configuration and/or the unlocked configuration. Namely, the lock mechanism 50 would typically be actuatable from the locked configuration to the unlocked configuration, such as with a key 44 as described above. In some embodiments, the lock mechanism 50 may also be configured to be actuated to the locked configuration (e.g., using a key 44). For example, a key 44 may be configured to communicate with wireless communication circuitry 58 in the fixed arm 46 for actuating the lock mechanism 50. However, the lock mechanism 50 could alternatively be configured to automatically lock when positioned within the housing 30 such that actuation with a key 44 or other manual intervention is unnecessary to lock the item of merchandise 10 to or within the housing 30. In other embodiments, the lock mechanism 50 may cooperate with a motor 60 or solenoid for operating the lock mechanism. The solenoid or motor 60 could be used to actuate the lock mechanism 50 between locked and unlocked positions.

In one embodiment, the lock mechanism 50 is operably engaged with a bracket assembly 40 and is configured to lock the bracket assembly in a locked configuration and to release the bracket assembly from the locked configuration (see, e.g., FIG. 5). Thus, in some cases, the lock mechanism 50 is configured to lock the arms 42 in a locked configuration and to unlock the arms in an unlocked configuration. This could be accomplished using a variety of techniques, such as those disclosed herein, e.g., using one or more motors 60 in operable engagement with each of the arms 42. As discussed above, the bracket assembly 40 may include one or more arms 42 configured to releasably engage the item of merchandise 10. At least one of the arms 42 may be configured to be unlocked via a lock mechanism 50. For instance, where a plurality of arms 42 are employed, one of the arms may be disengaged via actuation of the lock mechanism 50 to allow the item of merchandise 10 to be removed from the housing 30. For example, a key 44 may communicate with the security device 20 and is configured to actuate the lock mechanism 50, which in turn disengages at least one of the arms 42 from the item of merchandise 10. The arm 42 that is disengaged may be biased or otherwise moved away from the item of merchandise 10 such that unlocking of the arm causes the arm to automatically release the arm from the item of merchandise. The lock mechanism 50 could be similar to that described above, utilizing mechanical and/or electrical means for locking the bracket assembly 40 in position relative to the item of merchandise 10 and unlocking the bracket assembly. The item of merchandise 10 could be automatically removed from the housing 30 in the unlocked configuration. Alternatively, the arm 42 may be disengaged from the housing 30 to simply allow access to the item of merchandise 10 for authorized removal thereof.

It is understood, and as also disclosed above, that the housing 30 may take on many different configurations and include various alternative features. For example, the housing 30 may include one or more components operably engaged with one another. FIG. 2 shows that the housing 30 includes a lower portion 32 configured to be secured to a display surface 24 and an upper portion 36 configured to be secured to the item of merchandise 10. The upper portion 36 may have a top surface that is configured to at least partially receive the item of merchandise 10 thereon. The lower 32 and upper 36 portions may be separate components assembled together either at the time of manufacture or at the time of installation. In some cases, the upper 36 and lower 32 portions are not intended to be separated once installed. In other cases, the upper portion 36 may be removably supported by the lower portion 32 such that the upper portion may be removed from and placed on the lower portion by a user. In some instances, the lower portion 36 and the lower portion 32 may be configured to pivot relative to one another. For instance, the lower portion 32 may include a swivel assembly that allows the upper 36 and lower 32 portions to pivot relative to one another (e.g., between portrait and landscape orientations). Thus, the item of merchandise 10 may be pivotable to different orientations while secured to the housing 30 (see, e.g., FIGS. 1 and 3). Moreover, the lower portion 32 may be angled in some embodiments depending on the desired display angle desired for the item of merchandise 10. In other embodiments, one or more portions of the housing 30 is formed of metal. For example, the upper portion 36, arms 42, 46, and/or lower portion 32 may be formed of metal, while various other external or ornamental portions may be formed of a polymeric material. In one example, the upper portion 36 may include a sensor for detecting unauthorized removal of the item of merchandise 10 from the housing 30. Furthermore, in some cases, the housing 30 may be configured to accommodate one or more accessories. For instance, FIG. 11 illustrates that the housing 30 may include a recess 74 configured to receive a charger for charging the item of merchandise 10. In one example, the item of merchandise 10 is a wearable device, and the recess 74 may be configured to receive an OEM charger that is configured to charge the wearable device when the wearable device is seated on the housing 30.

The fixed arm 46 may include a printed circuit board (PCB) 52 that is electrically connected to various components of the security device 20. For example, FIG. 8 shows a PCB 52 that is electrically connected to a connector 70. In one embodiment, a power cord 54 and connector 70 could be utilized to transfer power to the item of merchandise 10. For example, an external power source or an internal power source within the housing 30 may transmit power through a power cord 54 and connector 70 engaged with an input port on the item of merchandise 10. In some embodiments, an external power source may provide power directly to the housing 30, and the housing may pass power to the item of merchandise 10. Thus, a power cord 54 may be electrically connected to the housing 30 and be configured to plug into the item of merchandise 10. The housing 30 may also include voltage regulation circuitry in cases where power is provided to the item of merchandise 10 from the housing. Moreover, the fixed arm 46 may house other electrical components, such as for example, wireless communication circuitry 58 (e.g., NFC, IR, and/or Bluetooth communications), visual indicators (e.g., LEDs), and/or one or more power sources (e.g., a battery or electrical conductors). Thus, in some embodiments, the fixed arm 46 is configured to house a number of different electrical components.

Figure 6:
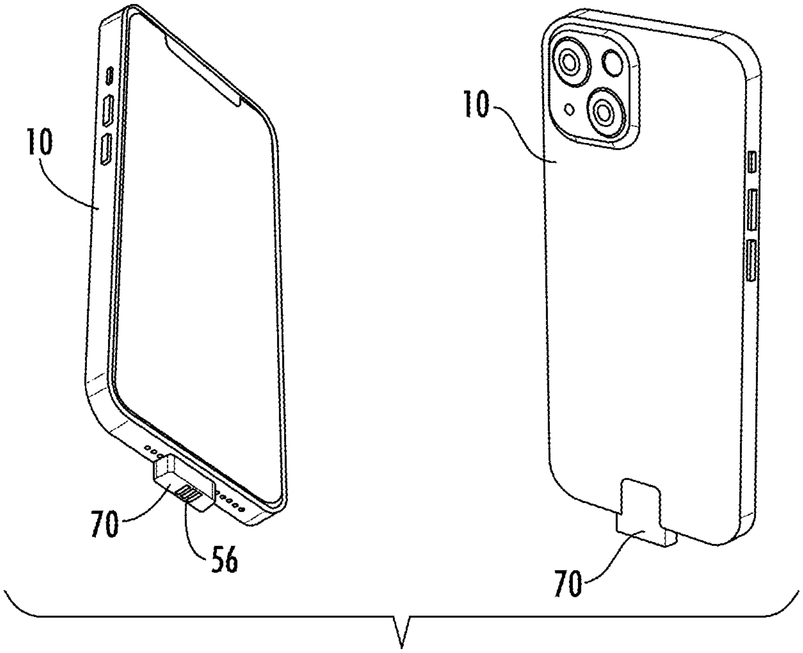
FIG. 6 illustrates front and rear perspective views of a connector in engagement with an item of merchandise according to one embodiment of the present invention.
Figure 7:
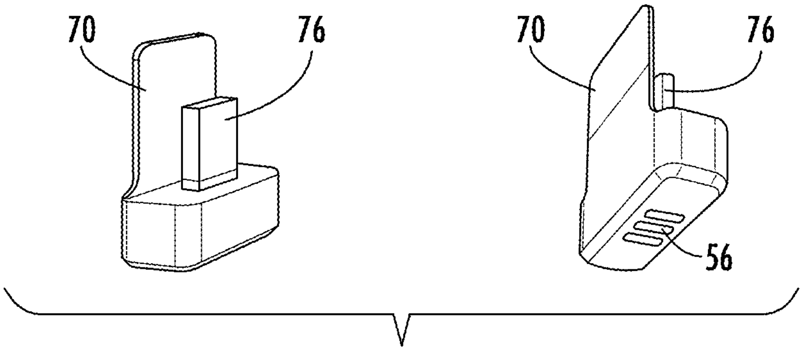
FIG. 7 illustrates perspective views of the connector shown in FIG. 6 according to one embodiment of the present invention.

As shown in FIGS. 6 and 7, in one embodiment, the connector 70 is in the form a plug 76 that is configured to insert with an input port of the item of merchandise 10 (e.g., a USB-C port). Thus, the item of merchandise 10 and connector 70 are configured to be lifted together off of the housing 30. The connector 70 may include electrical contacts 56 configured to mate with engage corresponding electrical contacts on the fixed arm when the item of merchandise 10 is placed in engagement with the housing 30 (see, e.g., FIG. 10). The connector 70 may further include magnets configured to attract to magnetically attractable material (or vice versa) on the fixed arm 46 to facilitate engagement therewith. The connector 70 may allow for differences in thickness of various items of merchandise 10 when the item is placed in engagement with the housing 30, as the electrical contacts of the connector and the arm may be sized and configured to engage with one another in different positions relative to one another (e.g., in a Z-direction). As illustrated, the connector 70 may be configured to engage a bottom and rear surface of the item of merchandise 10 and be free of any wires or cables, as the connector is only engaged with the item via the input port. In a similar manner as discussed above, the electrical connection between the contacts 56 and the contacts of the arm 46 may facilitate automatic actuation of the arms 42.

In another embodiment shown in FIGS. 18-20, the security device 20 may include features for mounting the security device to a display surface 24. In this example, the security device 20 may include a threaded shaft 78 extending from the housing 30 and a speednut 80. The threaded shaft 78 is configured to be extended through a hole or opening defined in the display surface 24, and the speednut 80 is configured to threadably engage the threaded shaft and tighten against the display surface 24, opposite the housing 30, to thereby secure the housing to the display surface. Thus, in this example, the threaded shaft 78 may include external threads, while the speednut 80 may have interior mating threads. In some advantageous embodiments, the threaded shaft 78 has a rectangular cross section, and the speednut 80 has a corresponding rectangular channel defined therethrough. In this way, the rectangular shaped channel is configured to accept the threaded shaft 78 prior to any threads engaging. Thus, the axes of the threads are always aligned when they start to engage to prevent or limit cross-threading, which can be prevalent with hard-to-reach locations. In some instances, the speednut 80 may include a knurled outer surface, engagement members, or the like that assists a user's grip when installing the speednut under a display surface 24.

The foregoing has described one or more embodiments of a security device for securing an item of merchandise from theft or unauthorized removal. Although embodiments of the present invention have been shown and described, it will be apparent to those skilled in the art that various modifications thereto can be made without departing from the spirit and scope of the invention. Accordingly, the foregoing description is provided for the purpose of illustration only, and not for the purpose of limitation.

That which is claimed is:

1. A security device for securing an item of merchandise from theft, the security device comprising:

a bracket assembly comprising a plurality of arms configured to engage the item of merchandise, at least one of the plurality of arms configured to move between an engaged position and a disengaged position;

a housing operably engaged with the bracket assembly and configured to be secured to a display support for displaying the item of merchandise; and an actuation mechanism operably engaged with the housing and the bracket assembly, the actuation mechanism configured to actuate the at least one of the plurality of arms between the disengaged position and the engaged position, the item of merchandise being secured to the housing in the engaged position, wherein the actuation mechanism is configured to be actuated via an electronic key for moving the at least one of the plurality of arms from the engaged position to the disengaged position to allow the item of merchandise to be removed from the housing, wherein the actuation mechanism is configured to be automatically deactuated in response to engagement of the at least one of the plurality of arms with the item of merchandise.

2. The security device of claim 1, wherein the plurality of arms are configured to move simultaneously between the engaged position and the disengaged position.

3. The security device of claim 1, wherein the actuation mechanism comprises a motor configured to be activated for moving the at least one of the plurality of arms.

4. The security device of claim 3, wherein the motor is configured to be activated based on a current of the motor.

5. The security device of claim 3, wherein the motor is configured to be deactivated based on a current of the motor to thereby automatically deactuate the actuation mechanism.

6. The security device of claim 3, further comprising a proximity sensor coupled to the housing, wherein the motor is configured to be activated or deactivated based on the proximity sensor detecting the item of merchandise.

7. The security device of claim 6, wherein the proximity sensor is a light sensor.

8. The security device of claim 3, further comprising a plurality of motors each configured to actuate at least one of the plurality of arms.

9. The security device of claim 8, wherein one of the plurality of motors is configured to actuate at least one of the plurality of arms in an X-direction and another of the plurality of motors is configured to actuate at least one other of the plurality of arms in a Y-direction.

10. The security device of claim 3, wherein the motor is configured to rotate in each of a clockwise and counter-clockwise direction for moving the at least one of the plurality of arms between the engaged and disengaged positions.

11. The security device of claim 1, wherein at least one of the plurality of arms comprises a connector for electrically connecting to the item of merchandise.

12. The security device of claim 11, wherein the at least one of the plurality of arms comprising the connector is fixed to the housing and is not adjustable relative to the housing.

13. The security device of claim 11, wherein the actuation mechanism is configured to automatically actuate the at least one of the plurality of arms in response to an electrical connection between the connector and the item of merchandise.

14. The security device of claim 1, further comprising a removable connector configured to engage an input port of the item of merchandise, wherein the removable connector comprises one or more electrical contacts.

15. The security device of claim 14, wherein at least one of the plurality of arms comprises one or more electrical contacts configured to mate with and engage the one or more electrical contacts of the removable connector to establish an electrical connection, and wherein the actuation mechanism is configured to be automatically actuated in response to the electrical connection.

16. The security device of claim 1, wherein the actuation mechanism comprises a sensor for determining an orientation of the bracket assembly prior to actuating the plurality of arms.

17. The security device of claim 1, wherein the actuation mechanism is configured to move the at least one of the plurality of arms from the engaged position to the disengaged position and from the disengaged position to the engaged position.

18. The security device of claim 1, wherein the actuation mechanism is configured to automatically actuate the at least one of the plurality of arms from the disengaged position to the engaged position in response to engagement of the item of merchandise with the housing.

19. The security device of claim 1, wherein one of the plurality of arms comprises wireless communications circuitry for communicating with the electronic key.

20. The security device of claim 19, wherein the one of the plurality of arms with wireless communications circuitry is configured to be electrically connected and transfer power to the item of merchandise when in engagement with the item of merchandise.

21. The security device of claim 1, wherein the electronic key is a mobile device.

22. The security device of claim 1, wherein the actuation mechanism is configured to be automatically deactuated at least partially based on an input from a sensor configured to detect engagement of the at least one of the plurality of arms with the item of merchandise.

23. The security device of claim 22, wherein the actuation mechanism comprises a motor configured to actuate the at least one of the plurality of arms, and wherein the actuation mechanism is configured to automatically deactivate the motor based on the input from the sensor.

24. The security device of claim 1, wherein the actuation mechanism is configured to lock the item of merchandise to the housing when the plurality of arms are in the engaged position such that the item of merchandise is incapable of being removed from the housing without authorization.

25. The security device of claim 1, wherein the actuation mechanism comprises at least one motor and at least one gear in operable engagement with the motor.

26. A security device for securing an item of merchandise from theft, the security device comprising:

a plurality of arms configured to engage the item of merchandise, at least one of the plurality of arms configured to move between an engaged position and a disengaged position;

a housing operably engaged with the plurality of arms and configured to be secured to a display support for displaying the item of merchandise; and at least one motor operably engaged with the housing and the plurality of arms, the at least one motor configured to actuate the at least one of the plurality of arms between the disengaged position and the engaged position, the item of merchandise being secured to the housing in the engaged position, wherein the at least one motor is configured to be activated for moving the at least one of the plurality of arms from the engaged position to the disengaged position to allow the item of merchandise to be removed from the housing, wherein the at least one motor is configured to be automatically deactivated in response to engagement of the at least one of the plurality of arms with the item of merchandise.

27. A method for securing an item of merchandise from theft, the method comprising:

actuating at least one of a plurality of arms from a disengaged position to an engaged position with an item of merchandise, the item of merchandise being unable to be removed from the housing with the at least one of the plurality of arms in the engaged position and to be able to be removed from the housing with the at least one of the plurality of arms in the disengaged position;

automatically deactuating the at least one of the plurality of arms in response to engagement of the at least one of the plurality of arms with the item of merchandise; and actuating the at least one of the plurality of arms in response to communication with an electronic key for moving the plurality of arms from the engaged position to the disengaged position to allow the item of merchandise to be removed from the housing.

* * * * *